Oct. 20, 1925.
P. FASSLER
BUTT WELDING MACHINE
Filed April 18, 1924 4 Sheets-Sheet 4
1,557,573
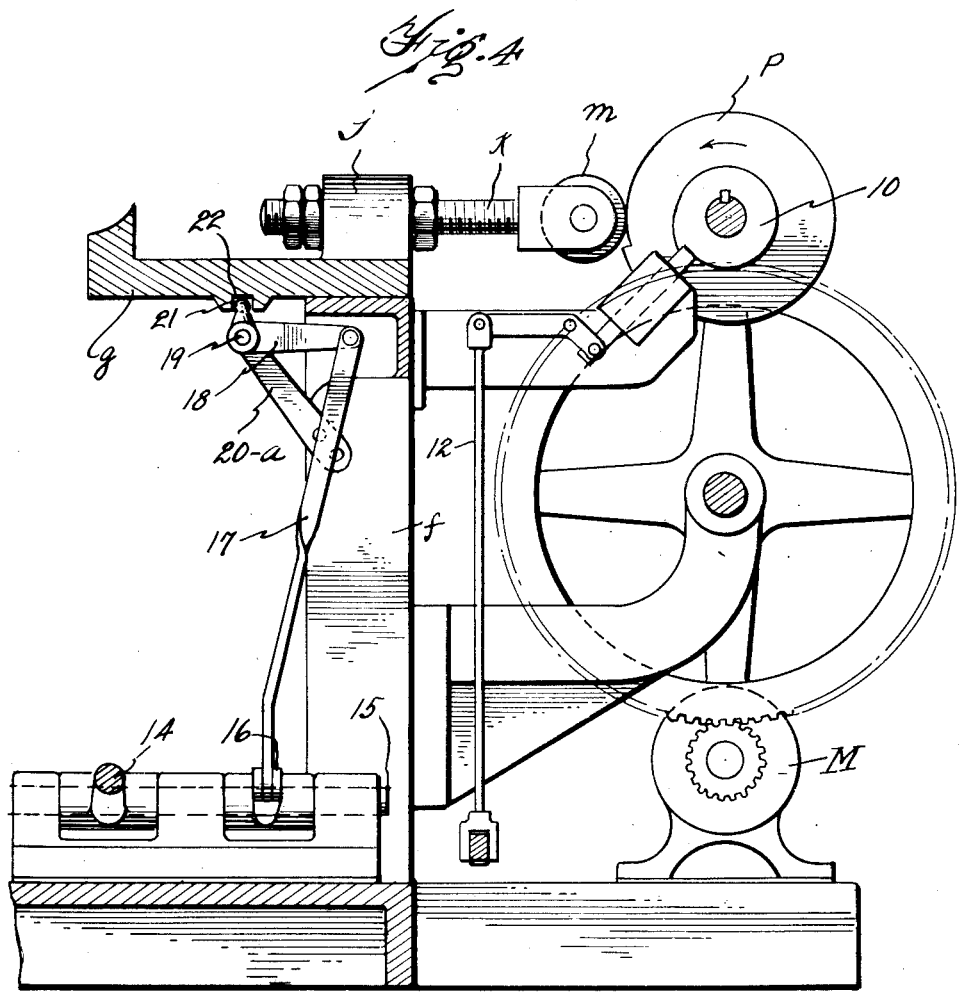
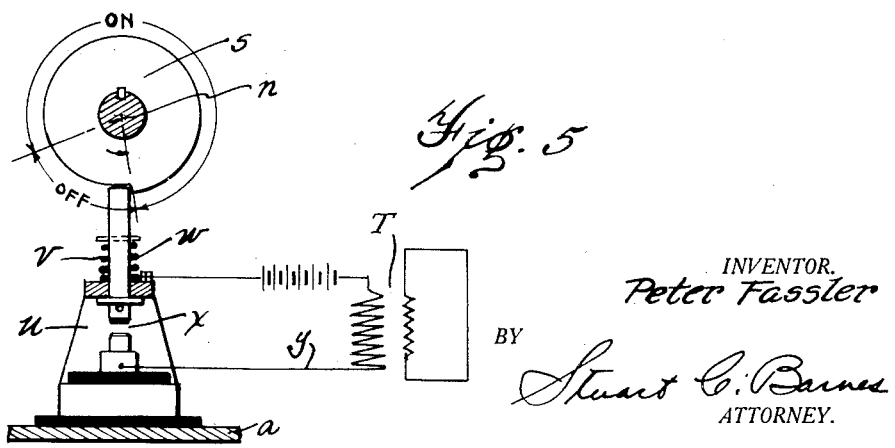
INVENTOR.
Peter Fassler
BY
Stuart C. Barnes
ATTORNEY.

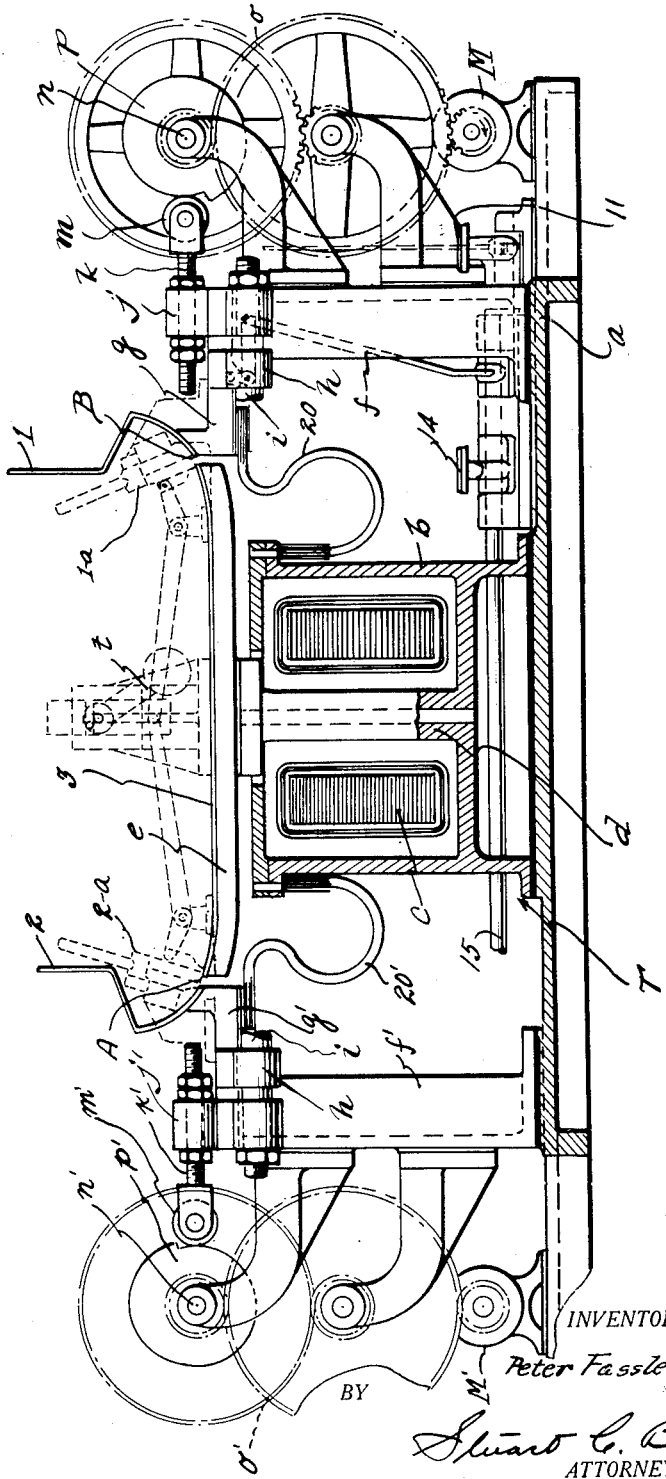

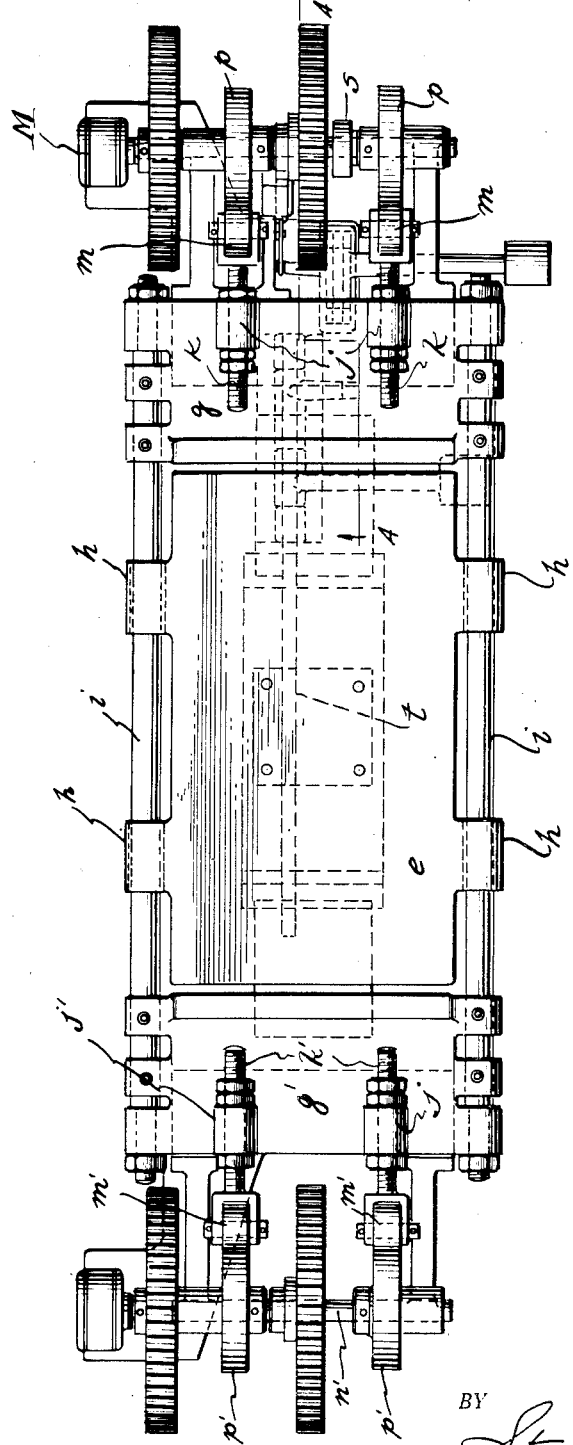

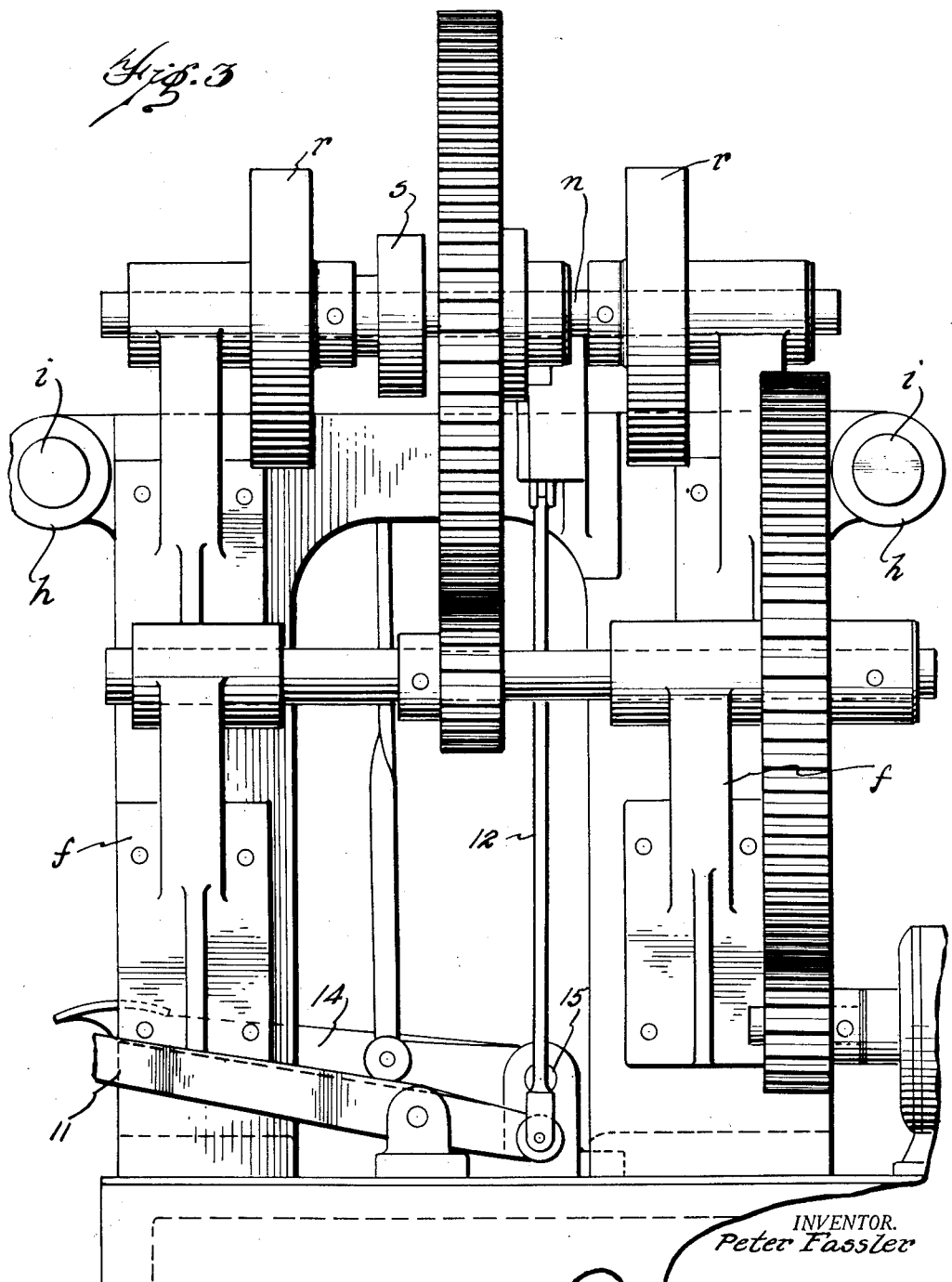

Patented Oct. 20, 1925.

1,557,573

UNITED STATES PATENT OFFICE.

PETER FASSLER, OF DETROIT, MICHIGAN, ASSIGNOR TO FISHER BODY CORPORATION, OF DETROIT, MICHIGAN, A CORPORATION OF NEW YORK.

BUTT-WELDING MACHINE.

Application filed April 18, 1924. Serial No. 707,328.

*To all whom it may concern:*

Be it known that I, PETER FASSLER, a citizen of Switzerland, residing at Detroit, in the county of Wayne and State of Michigan, have invented certain new and useful Improvements in Butt-Welding Machines, of which the following is a specification.

This invention relates to a machine arranged to weld a plurality of seams, preferably with a butt weld.

It is the object of the invention, more particularly, to simultaneously weld together several sheet metal panels such as the stamped panels used in automobile body construction.

It is not broadly new to butt weld such panels together by electric resistance welding or by what is sometimes termed flash-welding. However, so far as I know, no one has designed a machine provided with suitable jigs or stock holders so that a plurality of these sheet metal panels may be welded together in one operation, thereby very materially lessening the labor costs in joining the panels together. This is especially desirable in welding together the parts that go to form the rear seat shell of an automobile body. The invention will be described and illustrated with particular reference to such a seat shell, but obviously it has a wider application, as will be apparent from the wording of the claims.

The machine is so constructed that the transformer housing forms the major portion of the secondary circuit. A stationary welding jig is supported on a pillar rising from the center of the casing, which pillar is an integral part of the copper casting which forms the transformer housing and the secondary. This pillar forms the one pole of the secondary while a plurality of poles of the opposite sign are formed by suitable traveling carriages which are mechanically operated and properly timed to bring the jigs and the work together, and to afford the proper mechanical pressure to secure the best results in welding.

The construction is such that the transformer, in accordance with the best practice, is located directly in the center of the machine and directly under the center welding fixture. The two movable welding jigs are immediately at the side of the transformer and connected by large flexible copper conductors. The details of the construction will be better understood when the several illustrated parts are more particularly described.

In the drawings:

Fig. 1 is a front elevation of the machine partly in section showing the work in place to be welded.

Fig. 2 is a plan view of what is shown in Fig. 1.

Fig. 3 is an end view of the same.

Fig. 4 is an enlarged section showing the cam operated means for applying the pressure to the joint to be welded.

Fig. 5 is a diagrammatic view showing the electrical wiring and the means for making and breaking the electrical circuit through the primary of the transformer.

Supported on a base $a$ and suitably insulated therefrom is a transformer housing $b$. Within the housing is the primary coil $c$ which is suitably connected to a source of energy controlled by a mechanism later to be described, whereby the current may be turned on or off. A pillar $d$, which is an integral part of the housing casting has secured thereto the work support $e$ which is one of the poles of the secondary circuit.

At each end of the machine is a standard $f$ and $f'$ which slidably support the movable work supports or stock holders $g$ and $g'$. These movable stock holders are clearly shown in Fig. 2. The lugs or ears $h$ carried by the work support $e$ support the guide rods $i$. The movable stock holder $g$ and $g'$ are slidable on these guide rods and each are provided with bosses $j$ and $j'$ in which are adjustably secured the arms $k$ and $k'$ provided with the rollers $m$ and $m'$. Suitably supported from the standards $f$ and $f'$ are the jack shafts $n$ and $n'$ and the transmission gears $o$ and $o'$ connect this shaft to the motors M and M'. As the motors are actuated the jack shafts will be driven in a counter-clockwise direction as viewed in Fig. 4. Keyed or otherwise secured to these shafts are the cams $p$ and $p'$ against which the rollers $m$ and $m'$ carried by the arms $k$ and $k'$ engage. The cams are so constructed that during the first part of their movement the stockholders $g$ and $g'$ will be moved towards the center of the machine while during the latter half of the movement of said cams the work will be held for such a time and in such a manner as to apply the necessary pressure between the different pieces of work so that the joints may be successfully butt-welded by the resistance method.

As shown in Fig. 1, the pieces of work designated 1 and 2 are clamped to the movable stockholders $g$ and $g'$ by the clamps $1^a$ and $2^a$. The piece of work that is held stationary is clamped to the central support $e$ by means of the toggle clamp $t$. It will be plainly evident that as the movable stockholders are moved towards the center of the machine, the work designated 1 and 2 will be forced into contact with the work 3 clamped to the central support $e$, and further movement of the cam $p$ causes the work 1 and 2 to be forced under pressure and held under pressure while so contacting.

To obtain a good weld by the resistance method it is necessary to provide a current, which passes through these joints, having a low voltage and a high amperage. To obtain such a weld it is necessary to throw the current on while the several pieces of work are held in close contact with each other. To accomplish this I secure a switch cam $s$ (Fig. 5) preferably formed of insulating material, to the shaft $n$ and supported and suitably insulated from the base is a bracket $u$ which slidably supports the contact pin $v$. The coil spring $w$ forces the pin into engagement with the cam, and as the cam rotates in a counterclockwise direction, the initial movement of the cam will cause the pin to be forced downwardly and close the switch gap $x$ for completing the primary circuit $v$. This movement of the contact pin is carried on while the pieces of work are being brought together. Preferably as the same come in contact the contact pin is so timed as to close the switch gap $x$ and complete the circuit. The transformer designated as a whole by T transforms the ordinary power current into one having a low voltage and a high amperage known as the secondary current. The work is secured to the poles of the secondary circuit as described and when the switch gap $x$ is closed the secondary current will pass through the supports $g$ and $g'$ and $e$, and the work 1, 2 and 3, and will electrically weld the pieces of work together at the joints A and B. The moving of the cam $s$ is so timed that at the completion of one revolution the current will be shut off through the primary coil, thereby turning off the secondary current. At the same time the cam $p$ completes another revolution and releases the roller $m$, whereby the movable stock holders may be manually moved back by means now to be described, to allow the work to be taken out of the machine.

A clutch 10, (Fig. 4) controls the rotation of the shaft $n$ and the clutch pedal 11 is depressed by the foot of the operator, which pushes up on the draft rod 12, thus withdrawing the pin 13 from the clutch collar to release the clutch and to connect the shafts $n$ and $n'$ to the driving member of the transmission. This is the usual form of clutch device which need not be described or shown in detail. This pedal 11 may be suitably connected to a clutch mechanism carried by the shaft $n'$, which is located at the other end of the machine, whereby the cam $p'$ is also rotated actuating the movable support $g'$ through the arm $k'$ and the roller $m'$. Obviously, it will be plain that these movable stock holders may be either operated independently of each other by providing separate foot levers controlling them or they may be operated simultaneously by connecting the clutch parts in such a manner that they will both be operated by a movement of one of the pedals.

After the weld has been completed and the current has been turned off the operator may release the clamps $1^a$, $2^a$, and $t$, and then depressing the foot lever 14 which rocks the shaft 15 (Figs. 1, 3 and 4). An arm 16 is secured to this rock shaft 15 and the link 17 has one end secured to the end of the arm 16, and the other end connected to the bell crank 18, pivotally supported as at 19 on a bracket $20^a$, carried by the pillar $f$. The free end of this bell crank is provided with a ball 21, which is adapted to engage in a recess 22 carried by the stock holder $g$. It is plainly evident that when the cams $p$ and $p'$ have completed one revolution so as to free the rollers $m$ and $m'$, the stock holders $g$ and $g'$ may be forced away from the work by depressing the pedal 14 which, through the suitably bell crank connections, positively moves the stockholders $g$ and $g'$. This allows the stock holders to be retracted so as to receive another set of work pieces to be welded.

To complete the circuit between the housing $b$ and the movable stock holders $g$ and $g'$, I have provided the flexible connectors 20 and 20' (see Fig. 1). The secondary current will pass from the housing $b$ through the stock holders $g$ and $g'$, through the work 1 and 2, then through the work 3 to the support $e$ and to the pillar $d$, thereby completing the secondary circuit.

What I claim is:

1. In a butt welding machine, the combination of means for supporting a stationary piece of sheet panel stock, means for supporting a plurality of other pieces of sheet panel stock, means by which the second mentioned pieces of sheet panel stock may be brought into edge-to-edge and registering line contact with the first mentioned sheet panel stock on different sides of the panel stock, and means by which a current of electricity may be passed through the sheet panel stock pieces at the contacting and registering edges for effecting a butt weld by electrical resistance welding.

2. In a butt welding machine, the combination of means for supporting a stationary piece of sheet metal stock, means for supporting separate sheets of metal stock on opposite sides of the first mentioned stock, means for simultaneously moving the second mentioned pieces of stock into registering edge-to-edge or line contact and applying pressure to such butt contacting edges of stock, and means for passing a current of electricity through the stock to butt weld the joints of the several pieces of stock by electrical resistance welding.

3. In a butt welding machine, the combination of a support, a transformer supported thereby and including a primary coil, a housing surrounding said primary coil serving to act as a secondary, a support secured to said housing for supporting a piece of sheet metal stock, movable stock holders movably supported on the support and electrically connected to the secondary housing of the transformer and provided with means for supporting other pieces of sheet metal stock, means for moving the movable stock holders to bring the stock carried thereby in contact edge to edge with the stock carried by the support secured to the transformer housing, and means for energizing the primary coil to force the secondary current through said stock supports for the purpose of butt-welding the several joints between the stock pieces.

4. In a butt welding machine, the combination of a support, a transformer housing supported thereby, a primary coil contained within the housing, a pillar secured to the housing and provided with a support for supporting a piece of stock, a plurality of stock holders movably supported on said support and electrically connected with said transformer housing, means for moving said stock holders to bring the stock carried thereby into contact with the stock supported by the pillar, and means for energizing the primary coil of the transformer whereby the transformer housing serves to conduct the secondary current to the several pieces of stock for the purpose of butt-welding the same together.

5. In a butt-welding machine, the combination of a transformer supported thereby and including a T-shaped housing, a primary winding contained within the housing, a plate secured to the stem of the T-shaped housing for supporting a piece of sheet metal stock, a plurality of movable stock holders for supporting sheet metal stock movably supported by the support and electrically connected to the transformer housing, means for moving said stock holders to bring the stock carried thereby into contact edge to edge with the stock supported by the transformer housing, and means for energizing the primary coil whereby the transformer housing and movable stock holders serve to conduct the secondary current to the stock for the purpose of simultaneously welding the several joints of said stock pieces.

6. In a butt welding machine, the combination of a support, means for supporting a panel of sheet metal stock thereon, a plurality of movable sheet metal panel stock holders movably supported on the first mentioned support, means for clamping the other stock to said movable stock holders, power driven means for actuating said movable stock holders to bring the sheet panel stock carried thereby into registering edge-to-edge contact with the first mentioned sheet panel stock on different sides of said panel and for applying pressure to said movable stock holders to force the pieces of sheet panel stock tightly together, means for passing current through the abutting stock to weld the several joints of said panel stock pieces, and manually operated means whereby the movable stock holders may be retracted and the welded panel stock removed from the machine.

In testimony whereof I have affixed my signature.

PETER FASSLER.